Oct. 14, 1952 F. L. LIPPY 2,614,155
ELECTRIC SHOCK ELIMINATOR
Filed April 25, 1950

INVENTOR
Fleming Lacy Lippy
BY R Houston Brett
ATTORNEY

Patented Oct. 14, 1952

2,614,155

UNITED STATES PATENT OFFICE 2,614,155

ELECTRIC SHOCK ELIMINATOR

Fleming Lacy Lippy, Richmond, Va.

Application April 25, 1950, Serial No. 157,988

2 Claims. (Cl. 175—264)

This invention relates to a new and useful improvement in an electric shock eliminator and more particularly to such a device used in connection with automobiles.

One of the most vexing, irritating and troublesome annoyances generally experienced by the operator of an automobile is electrical shocks received from static electricity. These electrical charges are generally caused by friction or the rubbing of the operator's wearing apparel against parts of the automobile; particularly the seat covers. Naturally, when such charges are created and any part of operator's body comes near or touches an attractive object of the automobile an electrical shock is received. These shocks seem to vary in intensity, and become greater in dry crisp weather.

One of the objects of this invention is the provision of a steering wheel adapted to eliminate electrical shocks.

Another object of this invention is the provision of a cover for a steering wheel that will also eliminate electrical shocks.

Figure 1:
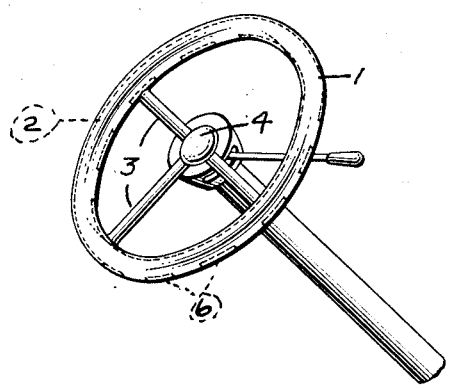
Figure 2:
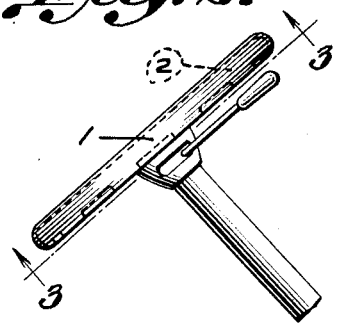
Figure 3:
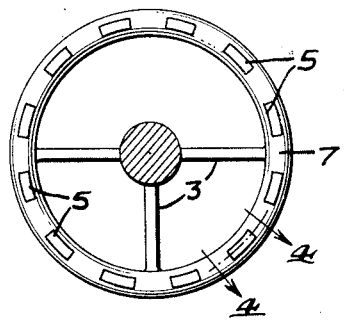
Figure 4:
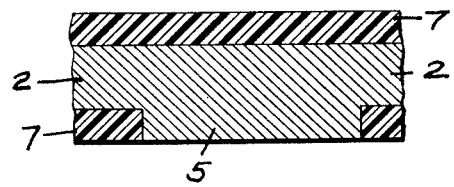
Figure 5:
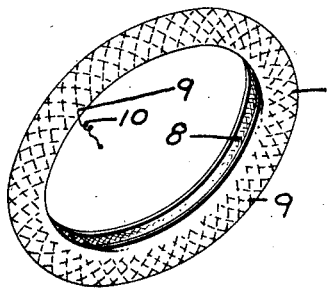

Other objects and features will more fully appear from the following description and accompanying drawings, in which:

Fig. 1 is a perspective of an automobile steering wheel;

Fig. 2 a side view thereof;

Fig. 3 a basal sectional view along lines 3—3 of Fig. 2;

Fig. 4 a sectional view along lines 4—4 of Fig. 3;

Fig. 5 a perspective of a cover; and

Figure 6:
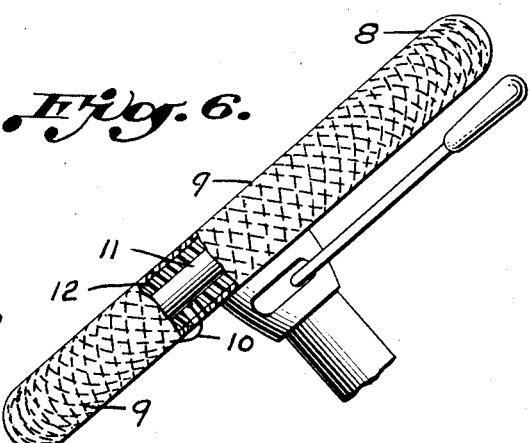

Fig. 6 a side view showing cover on steering wheel.

Referring to the drawings, an automobile steering wheel 1 consists of a metallic ring 2 provided with spokes 3 terminating in a hub 4. The base of said ring is provided with a plurality of projections 5 which form recesses 6 respectively disposed in alternate fashion with respect to said projections.

The ring (see Fig. 4) is disposed in a plastic or an electrical non-conducting material 7, except that the surfaces of the metallic projections are exposed. The wheel and hub are secured in metallic fashion to a steering post which connects to the steering gear of an automobile, not shown; but which is well known in the art. The wheel, spokes, steering post and gear are all metal to metal connections so that an electric current may be conducted through them to the frame.

A modification of the invention is illustrated in Figs. 5 and 6. A fabric cover 8 has disposed, sewed or woven therein for surface contact a plurality of electrical conductors 9 such as copper wire or the like. The wires may be woven in mesh fashion with the fabric or in any desired manner that will provide surface contact areas.

One end of a cable 10 is connected to wire 9 while the other end is connected to a ring 11 of an automobile wheel 12 whose construction is similar to that described hereinbefore.

The device functions as follows: When an automobile operator grasps the steering wheel to guide the car his hands contact the surfaces of projections 5 or wires 9. If there is any static electricity created by the usual frictional contact with operator's clothes and parts of the automobile such current will pass from the operator through the projectors or wires to wheel and through spokes to the steering mechanism and frame of the car.

Since the operator must necessarily have at least one of his hands on the wheel for the proper operation of the automobile it is obvious that a constant ground is provided whereby any electrical charges may pass from the operator to the car. It is further obvious that by the provision of this invention a constant electrical neutralization is provided between operator and car. The projections on wheel and wires on cover are so disposed that either or both hands of operator will contact one or more of projections or wires when wheel is grasped.

Having described this invention, what is claimed is:

1. In a device of the character described the combination consisting of a metallic steering wheel provided with metallic spokes; a metallic steering post for operable engagement with said spokes and the steering mechanism and frame of an automobile, said wheel and spokes being disposed in a plastic casing and metallic projections on said wheel having their respective surfaces in alignment with the plastic surface so as to permit their engagement with the hands of an operator.

2. In an automobile steering wheel, the combination consisting of a metallic ring provided with a plurality of metallic projections extending therefrom; a non-conducting material encasing said ring and projections with the exception of their ends which form a portion of the surface of said steering wheel; said ring and projections in electrical circuit with an automobile and adapted to conduct electrical energy upon engagement of an operator with any of the said exposed projection surfaces.

FLEMING LACY LIPPY.

REFERENCES CITED

The following references are of record in the file of this patent:

UNITED STATES PATENTS

| Number | Name | Date |
|---|---|---|
| 1,453,181 | Ridge | Apr. 24, 1923 |
| 1,744,004 | Hunt | Jan. 14, 1930 |
| 1,797,545 | Churcher | Mar. 24, 1931 |
| 1,945,283 | Loomis | Jan. 30, 1934 |
| 2,047,838 | Smith | July 14, 1936 |
| 2,216,363 | Crawford | Oct. 1, 1940 |
| 2,524,163 | Criss | Oct. 3, 1950 |